US010832692B1

(12) United States Patent
Diaz et al.

(10) Patent No.: US 10,832,692 B1
(45) Date of Patent: Nov. 10, 2020

(54) MACHINE LEARNING SYSTEM FOR MATCHING GROUPS OF RELATED MEDIA FILES

(71) Applicant: Amazon Technologies, Inc., Seattle, WA (US)

(72) Inventors: Ronald Diaz, Seattle, WA (US); Srikanth Kotagiri, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/049,369

(22) Filed: Jul. 30, 2018

(51) Int. Cl.
| | | |
|---|---|---|
| *G06F 17/00* | (2019.01) | |
| *G10L 19/018* | (2013.01) | |
| *G10L 15/26* | (2006.01) | |
| *G06N 7/00* | (2006.01) | |
| *G06N 20/00* | (2019.01) | |
| *G06F 16/683* | (2019.01) | |

(52) U.S. Cl.
CPC .......... *G10L 19/018* (2013.01); *G06F 16/683* (2019.01); *G06N 7/00* (2013.01); *G06N 20/00* (2019.01); *G10L 15/26* (2013.01)

(58) Field of Classification Search
CPC .............................. G10L 19/018; G06N 20/00
See application file for complete search history.

(56) References Cited

U.S. PATENT DOCUMENTS

| | | | | |
|---|---|---|---|---|
| 2007/0168409 A1* | 7/2007 | Cheung | .............. | G06K 9/00536 708/400 |
| 2010/0205174 A1* | 8/2010 | Jiang | .................. | G06K 9/00758 707/725 |
| 2011/0153050 A1* | 6/2011 | Bauer | ................... | G10L 19/018 700/94 |
| 2012/0002806 A1* | 1/2012 | Samari | .................. | H04H 60/37 380/28 |
| 2012/0078894 A1* | 3/2012 | Jiang | ................. | G06K 9/00758 707/723 |
| 2013/0279740 A1* | 10/2013 | Bauer | ................... | G06T 1/0021 382/100 |

* cited by examiner

*Primary Examiner* — Joseph Saunders, Jr.
(74) *Attorney, Agent, or Firm* — Patterson + Sheridan, LLP

(57) ABSTRACT

Techniques are described for verifying that an audio file corresponds to an instance of media content. An audio file is divided into a plurality of audio segments, and a digital fingerprint is generated for each of the plurality of audio segments. A digital signature is generated for the audio file by aggregating the digital fingerprints. The generated digital signature and at least one other digital signature corresponding to an instance of media content are processed as inputs to a linear regression machine learning model, to determine a measure of similarity between the generated digital signature and the at least one other digital signature. The linear regression machine learning model can be trained using a supervised learning approach and a set of training data. Embodiments determine whether the audio file corresponds to the instance of media content, based on the measure of similarity.

20 Claims, 9 Drawing Sheets

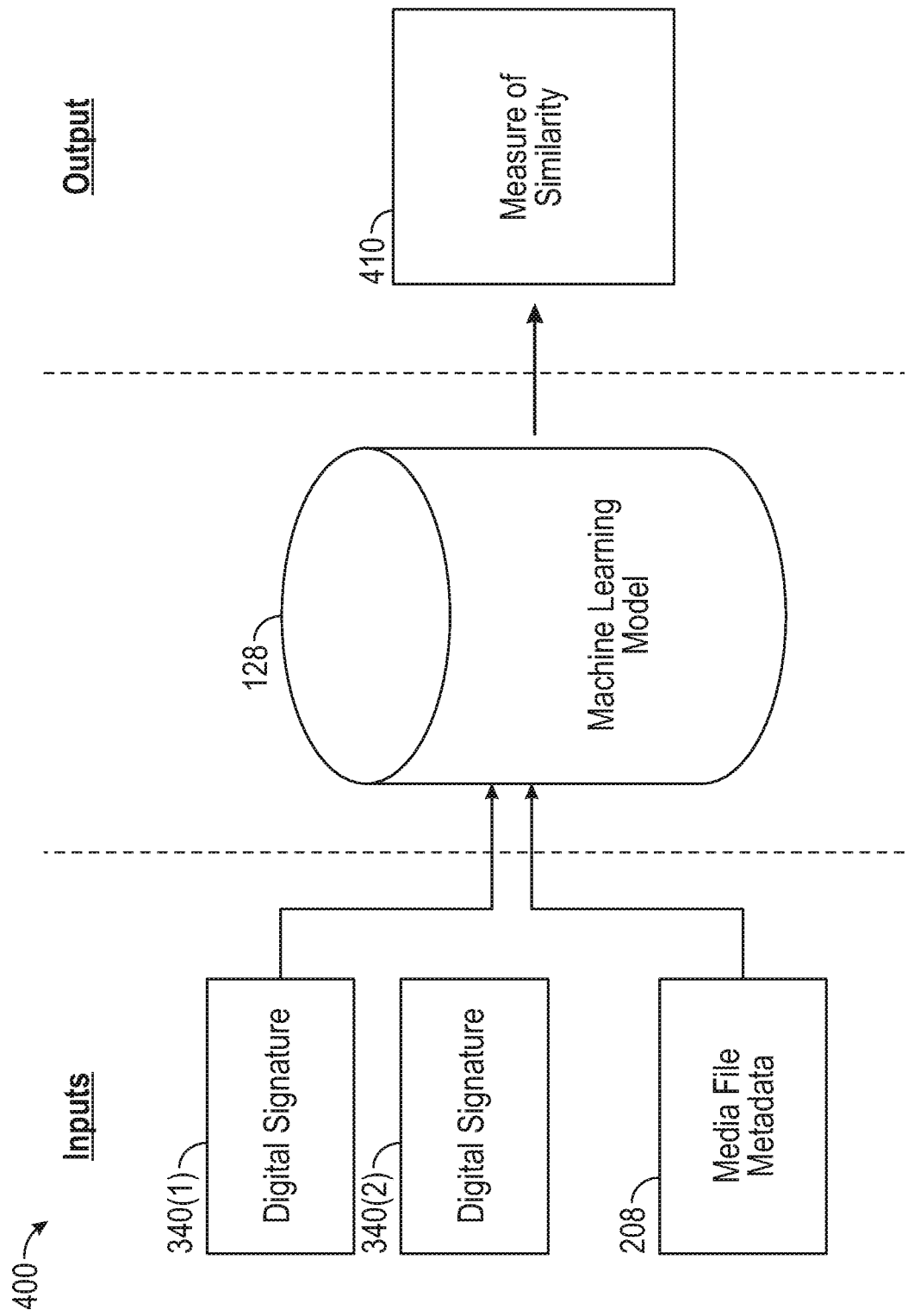

MACHINE LEARNING SYSTEM FOR MATCHING GROUPS OF RELATED MEDIA FILES

BACKGROUND

The present invention relates to identifying relationships between electronically-stored files, and more specifically, to a machine learning system for identifying matching groups of related media files and detecting anomalous media files within a group.

Many computing environments, such as video streaming services, contain multiple electronically-stored files that are logically grouped together. However, as the number of files grows, it has become increasingly difficult to detect problems within these logical groupings. For example, in a video streaming service, an audio file that contains a Portuguese language audio track for a video title could be mislabeled and accidentally added to the wrong logical grouping, e.g., the audio file could be associated with a different video title. As another example, the audio file containing the Portuguese language audio track could be mislabeled as containing the English audio track. In both of these instances, the customer experience of customers of the video streaming service will be significantly impacted due to the mislabeling of the audio file, as some users will hear an audio track from a different video title or will hear an audio track that is in a different language than they requested. However, as the number of electronically stored files and the number of logical groupings in these computing environments continue to grow, conventional quality assurance solutions simply cannot scale well enough to meet the demand.

BRIEF DESCRIPTION OF DRAWINGS

FIG. 4 is a block diagram illustrating a workflow for using a machine learning model to compare digital signatures for audio files, according to one embodiment described herein.

DETAILED DESCRIPTION

Figure 1:
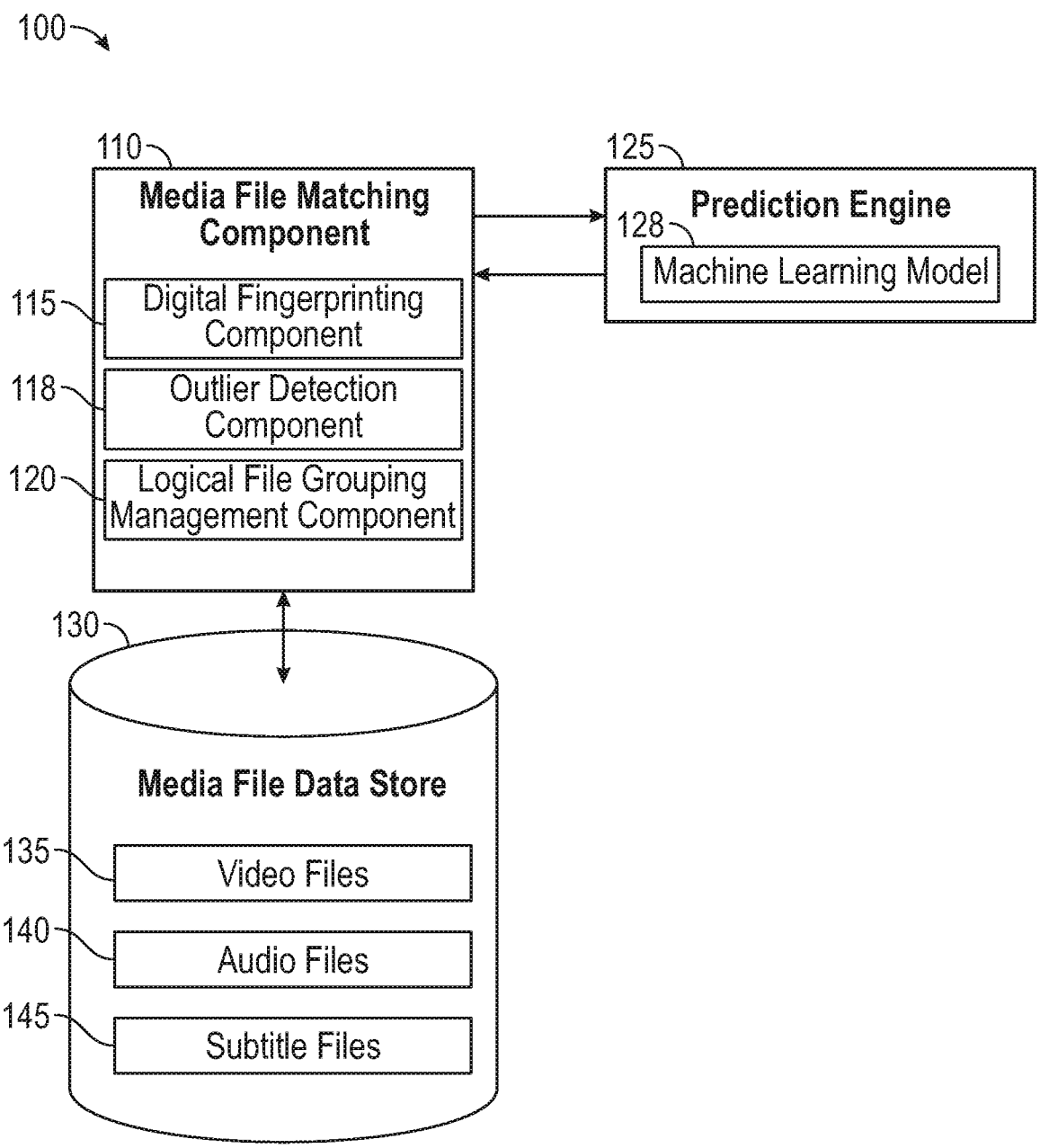
FIG. 1 is a block diagram illustrating a computing environment configured with a media file matching component, according to one embodiment described herein.

A video streaming service may contain a significant number of electronically-stored files that are logically grouped together. For instance, a given video title in a video streaming service can be associated with multiple different audio files and text files. For example, each of the different audio files could store the audio track associated with the video file but with the dialogue spoken in a different language. Similarly, the text files could contain subtitle data for each of the different languages. Moreover, a given video title can be encoded in multiple different video files, each having a different encoding rate and/or encoding format. As a result, numerous different files can be associated with a single video title.

One challenge when maintaining and organizing these various files is that errors in labeling files still occur. For example, manifest files are extensible markup language (XML) files which can specify filenames and file attributes for the video and/or audio files they are associated with, and can be used to group together multiple files with a common unique identifier. Such a unique identifier can be used to relate these media files to separately delivered title metadata, such as the title name, actors and synopsis data. Generally, manifest files can be formatted in proprietary formats or in supported industry standard formats, with examples including the MovieLabs Media Manifest Core (MMC) and Cable-Labs formats. A successful combination of manifest and associated file deliveries creates a viewing experience for the customer which allows them to, for example, select different playback audio (e.g., in different languages) and subtitle language combinations. However, when problems occur (e.g., a digital audio file containing the English audio track for a particular movie being mislabeled as the Portuguese audio track for the particular movie, or being labelled as the English audio track for a different movie), these problems can have a dramatic, negative effect on the user experience. Moreover, these problems may be difficult to detect until they have negatively affected a substantial number of users.

Additionally, many video streaming services today have grown in size significantly beyond what users can manually provide quality assurance for. For example, a single movie could be encoded in multiple different video files (e.g., each corresponding to a different bitrate) and could have numerous different audio encodings, each containing audio in a different language and corresponding to a respective text file containing subtitle data. Put simply, it is impractical for a user to manually watch each of these video files, listen to each of these different files and proofread each of these text files in order to verify that no problems exist for the given movie, and in many instances, a given user will not be able to understand the audio files containing dialogue in various languages well enough to determine whether these are the correct audio files. And considering that many video streaming services contain a significant number of different movies, shows and other pieces of video content, it is clear that automated verification techniques are needed.

As such, embodiments described herein provide machine learning techniques for identifying matching groups of related media files and detecting anomalous media files within a group. One embodiment provides a software component that generates a first digital signature that uniquely represents a digital audio file. For example, embodiments can divide the digital audio file into a plurality of segments. In one embodiment, each segment comprises a fixed-length segment. Embodiments can then generate a respective digital fingerprint that uniquely identifies each of the fixed-length segments. In one embodiment, the digital fingerprints are generated by filtering out or otherwise ignoring frequencies within the range of voice speech for the human voice.

Generally, the range of voiced speech for the human voice is roughly between the frequencies of 85 Hz and 255 Hz. As used herein, a frequency is said to generally correspond to the range of frequencies of human speech if the frequencies is within up to 20% outside of the range of 85 Hz to 255 Hz.

In one embodiment, minimum and maximum frequencies are determined for a range of audio within a digital audio file. Embodiments can then translate the minimum and maximum frequencies into audible decibels. In some embodiments, when voice amplification has been performed on the digital audio track (e.g., during post-processing operations when producing the digital audio track), the correct band to filtered out can be dynamically determined. In one embodiment, a media file matching component identifies a measure of energy at different frequencies within a digital audio file at a given point in time using a fast Fourier transform (FFT) spectrogram. The media file matching component can further identify islands where a strong signal is present. As an example, the media file matching component could determine that at 21.2 seconds into a particular digital audio file, a strong signal exists at 300 Hz, 4000 Hz and 1-3 Khz. Upon identifying the islands within the digital audio file, the media file matching component can match different files using these strong signatures.

Additionally, the media file matching component can give different relevance scores to these islands depending on the frequencies involved. For example, if the islands are within the frequency range of human speech, the media file matching component could determine the islands are less relevant, while other islands existing outside of the frequency range of human speech (e.g., a church bell, a car horn, etc.) could be considered significantly more relevant, as matching those islands can be much more useful for matching media files with different dubbed versions of the same content. Of course, such examples are provided for illustrative purposes only and without limitation, and more generally any digital fingerprinting or comparison technique can be used, consistent with the functionality described herein.

Additionally, some packaging formats for digital audio files can isolate human speech onto its own channel. In one embodiment, metadata for the digital audio file is analyzed to determine whether the digital audio file contains an isolated human speech channel. If the digital audio file is determined to contain an isolated human speech channel, embodiments can ignore this channel when generating digital fingerprints for the digital audio file.

In one embodiment, frequencies within a predefined range of frequencies are ignored when generating the digital fingerprint. For example, embodiments can be configured to ignore frequencies that are within the range of frequencies in which human speech generally resides. By ignoring this range of frequencies, embodiments can effectively compare audio tracks for an instance of media content (e.g., audio tracks for a movie, audio tracks for an episode of a show, etc.) in different languages with one another, without the need to perform computationally expensive speech removal processing on the audio tracks.

Embodiments can then aggregate the digital fingerprints generated for the segments to produce a digital signature for the digital audio file, and embodiments can process the generated digital signature using a machine learning model, to determine a likelihood that the digital audio file is associated with an instance of media content. For example, embodiments could train the machine learning model to accept two digital signatures as inputs and to output a measure of similarity that is determined to exist between the two input signatures. Embodiments could then process the generated digital signature for the digital audio file, together with a digital signature known to correspond to the instance of media content, using the machine learning model, and could determine whether the digital audio file is associated with the instance of media content based on the measure of similarity output by the machines learning model. Upon determining that the digital audio file is not associated with the instance of media content, based on the measure of similarity, embodiments can flag the digital audio file. For example, the digital audio file could be flagged for manual review by a user, who can determine whether the digital audio file should be associated with the instance of media content.

FIG. 1 is a block diagram illustrating a computing environment configured with a media file matching component, according to one embodiment described herein. As shown, the computing environment 100 includes a media file matching component 110, a media file data store 130 and a prediction engine 125. The media file matching component 110 includes a digital fingerprinting component 115, an outlier detection component 118 and a logical file grouping management component 120. The media file data store 130 contains video files 135, audio files 140 and subtitle files 145.

Generally, the digital fingerprinting component 115 is configured to process a segment of audio data and to output a digital fingerprint that uniquely (or substantially uniquely) represents the segment of audio data. For example, the digital fingerprinting component 115 could divide a given digital audio file containing the audio track for an instance of media content into a plurality of different audio segments, and the digital fingerprinting component 115 could process each segment to generate a respective digital fingerprint for each segment. Generally speaking, a number of techniques exist for generating digital fingerprints for audio data. For example, an audio data checksum could be calculated from the segment of audio data using a library such as Library Open Fingerprint Architecture (LibOFA), which generates an acoustic fingerprint of digital audio data.

The digital fingerprinting component 115 could then aggregate the digital fingerprints for the different segments of audio data into a digital signature that represents the digital audio file as a whole. The outlier detection component 118 could then determine whether the digital audio file is an outlier, relative to other audio digital audio files containing audio tracks for the instance of media content (e.g., audio tracks in different languages for the instance of media content). In one embodiment, the outlier detection component 118 is configured to transmit the digital signature that represents the digital audio file in question with another digital signature associated with the instance of media content to the prediction engine 125.

As shown, the prediction engine 125 contains a machine learning model 128. In one embodiment, the machine learning model 128 is a linear regression model that is trained to accept two digital signatures as inputs and to output a measure of estimated similarity determined to exist between the two input signatures. For example, upon receiving the digital signatures from the outlier detection component 118, the prediction engine 125 could process the digital signatures as inputs to the machine learning model 128 and could return the output of the machine learning model 128 to the outlier detection component 118. In one embodiment, the measure of similarity is expressed as a value between 0 and 1, where values closer to 1 indicate a higher amount of estimated similarity and values closer to 0 indicate a lesser amount of estimated similarity. However, one of ordinary skill in the art will understand that numerous different schemes could be used to represent the measure of estimated similarity, and more generally any suitable measure of similarity can be used, consistent with the functionality described herein.

In one embodiment, the prediction engine 125 is configured to train the machine learning model 128 using a supervised learning approach. For example, the prediction engine 125 could use a training set of data to train the machine learning model 128, where the training set includes a set of positive training samples containing matching digital signatures corresponding to known matches between audio files. For example, these known matches could be retrieved from manually curated sets of data, where users have manually verified the relationship between the audio files in question. Similarly, the training set of data can include negative training samples that contain mismatched digital signatures. The negative training samples could be programmatically generated by the prediction engine 125. For example, the prediction engine 125 could randomly or pseudo-randomly generate the digital signatures in the negative samples, all but statistically ensuring that the resulting pair of digital signatures will not be matching digital signatures. As another example, the prediction engine 125 could retrieve the negative training samples from a manually curated repository, where the negative training samples are known mismatches between digital signatures. More generally, any manner of producing or retrieving negative training samples can be used, consistent with the functionality described herein.

Upon receiving the measure of similarity from the prediction engine 125, the outlier detection component 118 can determine whether the digital audio file in question is an outlier relative to the other digital audio file associated with the instance of media content. For example, the outlier detection component 118 could compare the measure of similarity with a threshold level of similarity, and if the measure of similarity exceeds the threshold level of similarity (indicating that the digital signatures are more similar than required by the threshold), the logical file grouping management component 120 could determine that the digital audio file is not an outlier and is correctly classified as corresponding to the instance of media content. As another example, if the outlier detection component 118 determines that the two signatures are dissimilar (e.g., where the measure of similarity is less than the threshold level of similarity), the logical file grouping management component 120 could flag the digital audio file for manual curation. That is, the logical file grouping management component 120 could flag the digital audio file or otherwise bring the digital audio file to the attention of a user (e.g., by generating a notification to the user), requesting that the user manually verify the logical grouping of the digital audio file.

In one embodiment where the digital audio file in question was generated by transcoding a source audio file, the logical file grouping management component 120 could create a job for a transcoding component, requesting that the transcoding component automatically (i.e., without requiring user intervention) create another encoding of the digital audio file from the source audio file. The media file matching component 110 could then process the newly produced encoding of the digital audio file and if the newly produced encoding still appears to be an outlier, the logical file grouping management component 120 could flag the newly encoded audio file for manual curation.

Figure 2:
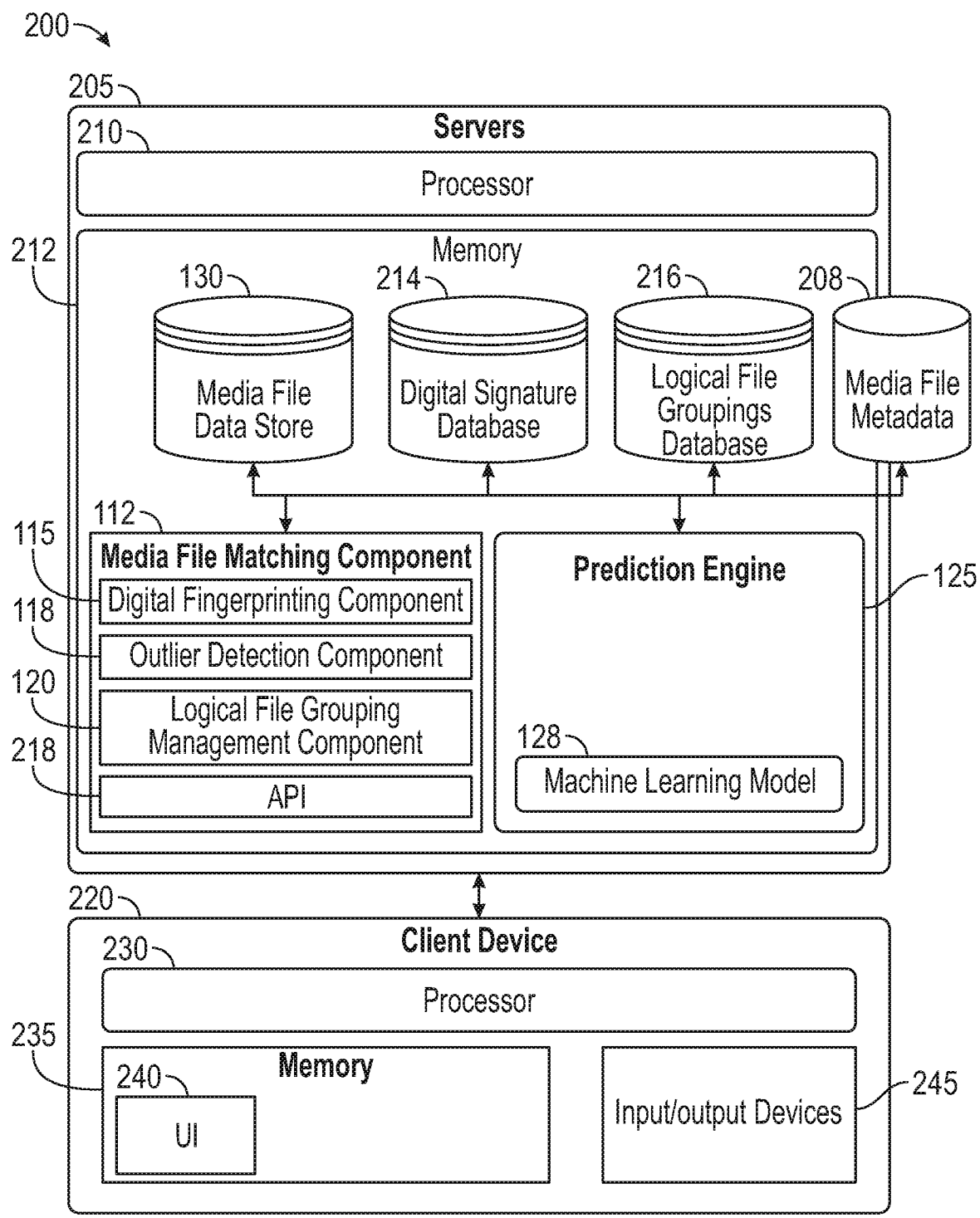
FIG. 2 is a block diagram illustrating a networked computing environment configured with a media file matching component, according to one embodiment described herein.

FIG. 2 is a block diagram illustrating a networked computing environment configured with a media file matching component, according to one embodiment described herein. As shown, the system 200 includes servers 205, which collectively provide processing capabilities 210 and memory 212. The memory 212 may include volatile and nonvolatile memory and/or removable and non-removable media implemented in any type or technology for storage of information, such as computer-readable instructions, data structures, program modules or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems or any other medium which can be used to store the desired information and which can be accessed by a computing device.

Stored in the memory 212 are multiple data stores, including a media file data store 130, a digital signature database 214 a logical file groupings database 216 and media file metadata 208. The client device 220 has a processor 230, memory 235 (e.g., volatile, non-volatile, etc.) and input/output (I/O) devices 245. A user interface (UI) 240 is stored in the memory 235 and executed on the processor 230 to allow the client device 220 to access the servers 205 of service 106 and request various content items. In one implementation, the UI 240 corresponds to the client application described above. For example, the UI 240 could be provided by a web browser or other application that renders pages or content served by the servers 205. In one embodiment, the UI 240 represents an audio-based interface for a digital assistant service, where the user interacts with the UI 240 verbally (e.g., using a microphone device). Generally, the I/O devices 245 can include any device capable of providing output to users of the device (e.g., a display device for outputting images, a speaker device for outputting sounds, etc.) as well as any devices through which a user can provide input (e.g., a touchscreen device, a mouse, a keyboard, etc.).

The media file metadata 208 generally contains data describing the various instances of media content within the media file data store 130. For example, the media file metadata 208 could contain an indication of whether a given instance of media content within the media file data store 130 is animated or non-animated content. The prediction engine 125 could use such metadata to train the machine learning model 128. Similarly, such metadata could be used as an input to an already trained machine learning model 128. Generally, such metadata can be useful when comparing audio files, as animated content may have slight differences in the audio tracks relative to non-animated content. For example, the frequency range of audio content for animated video content can differ between animated and non-animated content, due to how the audio tracks for animated content are generated. For instance, there can be slight differences in the post-production process of animated content to make sure that voice-overs align with the animation itself and in general audio tracks for animated content may be manipulated or processed more than audio tracks for non-animated content. As another example, clipping techniques may be used to clip an actor's voice so that the dialogue ends in sync with the animation.

Additionally, the media file metadata 208 could include a source or producer of a given instance of media content in the media file data store 130. For example, the production quality of animated media content can vary drastically across producers, and these variances in production quality can have a noticeable impact on the audio tracks of the content. For example, a very high quality production animation could have animated video frames that align very closely with the voices within the audio track, while a lower quality animation may have voices that align poorly with the animation. Such information could be considered when training and using the machine learning model 128 to determine measures of similarity between different audio tracks. For example, if the media file metadata 208 indicates that two audio tracks relate to an instance of media content that is animated and from a relatively lower quality producer, this could indicate that the audio tracks may correspond to the same instance of media content even when the dialogue across the audio tracks is not perfectly aligned (e.g., with the other audio track and/or the animation itself).

Generally, the media file data store 130 contains digital video files (e.g., various digital encodings of movies, episodes, and so on in various formats and bitrates), digital audio files (e.g., audio tracks in various languages corresponding to the digital video files), subtitle files (e.g., timestamped text files containing subtitle data that corresponds to one of the audio tracks), and so on. The digital signature database 214 generally contains associations between digital signatures generated by the media file matching component 112 and corresponding instances of media content. For example, the media file matching component 112 could query the digital signature database 214 using a particular digital signature to determine which instance of media content is associated with the digital signature. The logical file groupings database 216 generally contains data that associates various digital video files, audio files and subtitle files with an instance of media content.

Additionally, as shown, the memory 212 contains the media file matching component 112 and prediction engine 125. As discussed above, the prediction engine 125 contains a machine learning model 128. In one embodiment, the machine learning model 128 is trained to output an estimated measure of similarity between two input digital signatures. The media file matching component 112 contains the digital fingerprinting component 115, outlier detection component 118, logical file grouping management component 128 and an API 218. Generally, the API 218 exposes some functions to the client device 220. For example, the client device 220 could query the API 218 to determine a list of flagged digital audio files, where the digital audio files are flagged by the logical file grouping management component 128 as being outliers. More generally, the API 218 can expose any number and type of different functions, consistent with the functionality described herein.

Figure 3A:
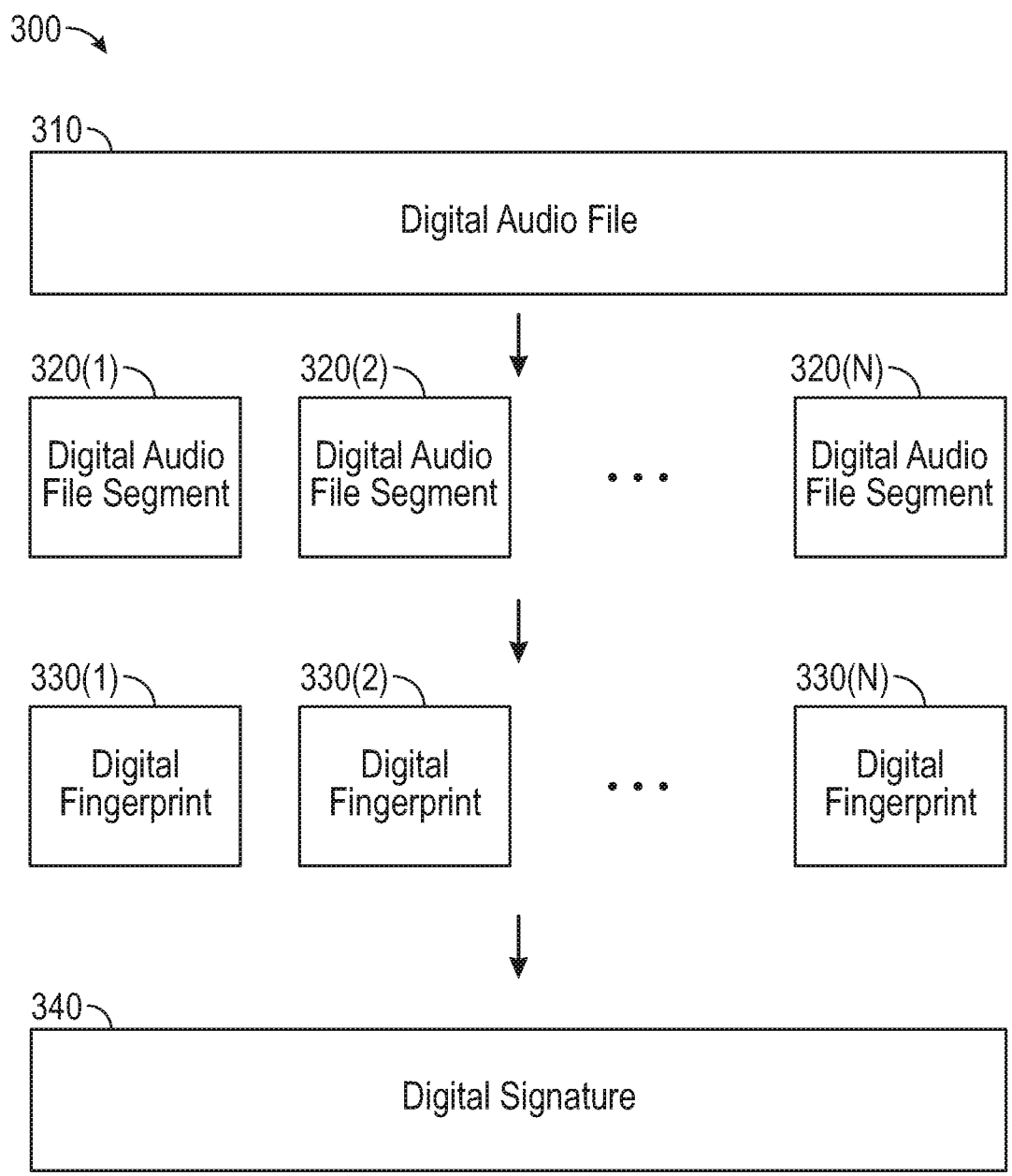
FIGS. 3A-B are a block diagrams illustrating workflows for generating a digital signature from a digital audio file, according to one embodiment described herein.

FIG. 3A is a block diagram illustrating a workflow for generating a digital signature from a digital audio file, according to one embodiment described herein. As shown, the workflow 300 illustrates a digital audio file 310. The media file matching component 112 divides the digital audio file 310 into the plurality of digital audio file segments 320(1)-(N). In one embodiment, the plurality of digital audio file segments 320(1)-(N) are fixed-length segments of audio data. For example, each of the plurality of digital audio file segments 320(1)-(N) could be 10 seconds in length. More generally, however, any fixed-length value can be used, consistent with the functionality described herein. Moreover, in one embodiment, the media file matching component 112 is configured to divide the digital audio file into segments of multiple different lengths. In a particular embodiment, the media file matching component 112 can divide the audio file into fixed length segments of a first length (e.g., 10 seconds), and can then divide the audio file a second time into fixed length segments of second length (e.g., 3 seconds). In an alternate embodiment, the media file matching component 112 can divide the audio file into variable length segments. In doing so, the media file matching component 112 could store a duration of each of the segments together with the fingerprint information.

Once the digital audio file 310 is divided into the digital audio file segments 320(1)-(N), the digital fingerprinting component 115 generates a respective digital fingerprint 330(1)-(N) from each of the digital audio file segments 320(1)-(N). In one embodiment, the digital fingerprinting component 115 is configured to exclude frequencies within a predefined range of frequencies in generating the digital fingerprints 330(1)-(N). In such an embodiment, the predefined range of frequencies generally corresponds to a range of frequencies of human speech. For example, the predefined range of frequencies could be approximately the range of 85 Hz to 255 Hz, which corresponds to the typical frequency range of human speech. In the depicted workflow 300, the media file matching component 112 aggregates the plurality of digital fingerprints 330(1)-(N) to generate the digital signature 340. In the depicted embodiment, the digital signature 340 corresponds to a collection of digital fingerprints (e.g., stored as a two-dimensional array).

Figure 3B:
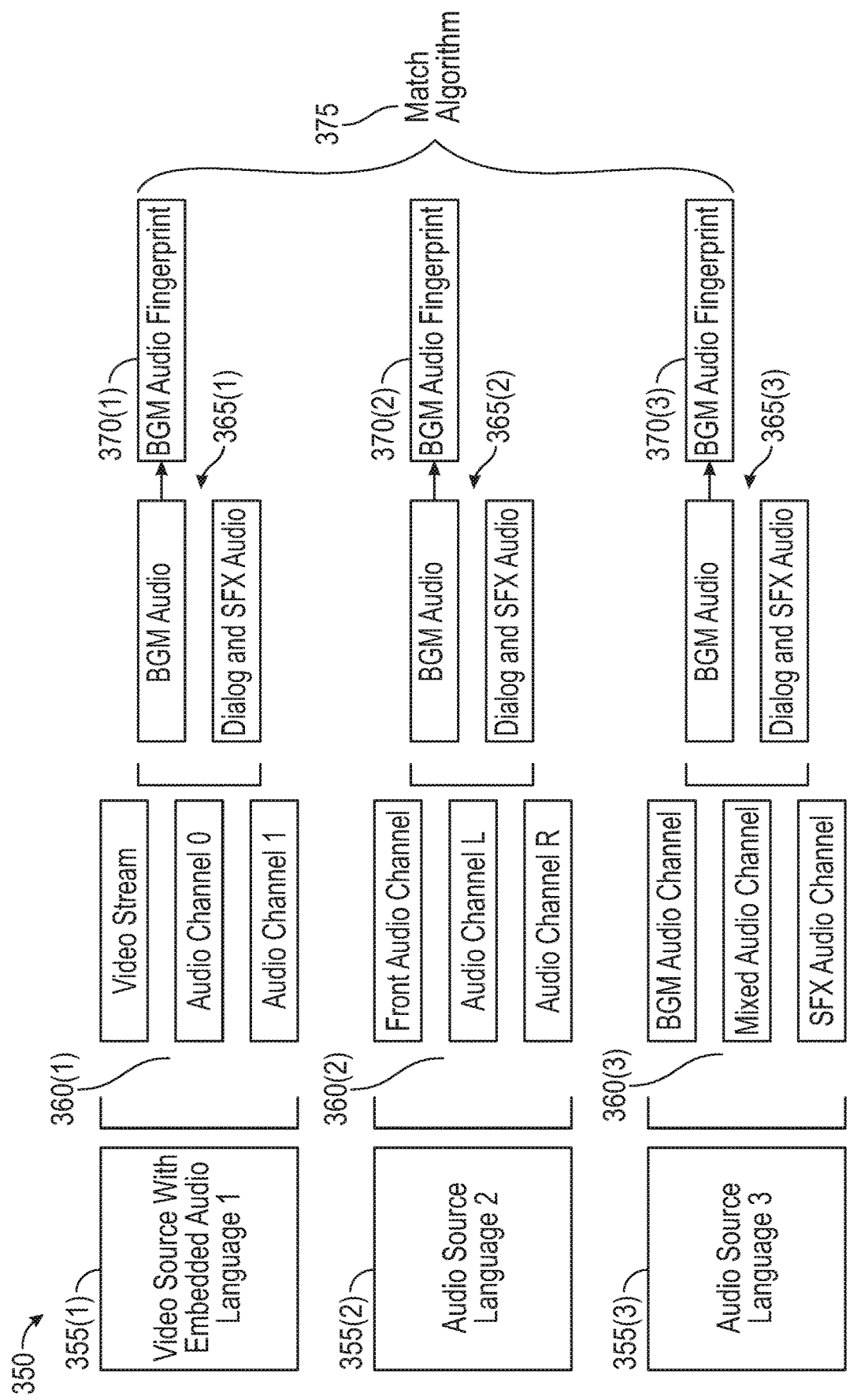

FIG. 3B illustrates a workflow 350 for processing a plurality of media files 355(1)-(3) that contain digital audio data. In the depicted embodiment, the media file 355(1) contains both video data and audio data in the language "language 1", while the media file 355(2) contains only audio data in the language "language 2" and the media file 355(3) contains only audio data in the language "language 3". The media file matching component 112 can divide each of the media files 355(1)-(3) into their respective streams 360(1)-(3). For example, the media file 355(1) has been divided into the streams 360(1), which include a video stream and audio channels 0 and 1. The media file 355(2) has been divided into the streams 360(2) which include three audio channels (front audio, audio channel L and audio channel R). Finally, in the depicted embodiment, the media file 355(3) has been divided into the streams 360(3), which include a background music (BGM) audio channel, a mixed audio channel and a sound effects (SFX) audio channel.

The media file matching component 112 can then generate a processed set of streams 365(1)-(3) from the streams 360(1)-(3). For instance, in the depicted embodiment, the media file matching component 112 has processed the audio channels 0 and 1 within the streams 360(1) for the media file 355(1), in order to generate a BGM audio stream for the media file 355(1), as shown by the BGM audio stream in the processed set of streams 365(1). For example, the media file matching component 112 could combine the audio channels 0 and 1 into a single audio stream, and the media file matching component 112 could filter out frequencies within the single audio stream that correspond to the frequency range of human speech in order to generate the BGM audio stream in the processed set of streams 365(1). In one embodiment, the media file matching component 112 can determine that one or more of the streams 360(1)-(3) contains dialogue and other sounds (e.g., animal sounds such as dogs barking), and can filter out the determined one or more streams to filter the frequencies corresponding to human speech.

In generating the processed set of streams 365(1)-(3), the media file matching component 112 can also selectively filter out some of the streams 360(1)-(3) for the media files 355(1)-(3). For example, in the streams 360(1), the media file matching component 112 has filtered out the video stream, as this stream is not needed for generating an audio fingerprint for the media file 355(1). The media file matching component 112 then generates a BGM audio fingerprint 370(1)-(3) from the processed set of streams 365(1)-(3) for each of the media files 355(1)-(3). The media file matching component 112 can then compare the BGM audio fingerprints using the matching algorithm 375, to determine whether any of the media files 355(1)-(3) are outliers within their logical grouping. For example, if the media file 355(3) has been mislabeled and contains the audio source for a different movie relative to the media files 355(1) and 355(2), the media file matching component 112 could use the matching algorithm 375 to determine that the media file 355(3) is an outlier and could flag the media file 355(3) accordingly.

As discussed above, the digital signature 340 can then be compared with other digital signatures, to determine whether the digital audio file 310 is related with other audio files corresponding to the other digital signatures. For example, the digital signature 340 could be input into a machine learning model, together with another digital signature, and the machine learning model could output a measure of estimated similarity between the two inputs. An example of this is shown in FIG. 4, which is a block diagram illustrating a workflow for using a machine learning model to compare digital signatures for audio files, according to one embodiment described herein. As shown, the workflow 400 illustrates the digital signatures 340(1) and 340(2) being used as inputs to the machine learning model 128, along with digital audio file metadata 405. As discussed above, the media file matching component 112 can produce the digital signatures 340(1) and 340(2) by processing digital audio files.

In one embodiment, the machine learning model 128 represents a linear regression machine learning model that was trained using a supervised learning approach to calculate the estimated measure of similarity 410 from two input digital signatures. In such an embodiment, the machine learning model 128 could be trained using a set of positive training samples that contains digital signatures generated from audio tracks that are retrieved from a manually curated set of data that contains known matches of audio tracks. Additionally, the machine learning model 128 could be trained using negative training samples could contain digital signatures that are programmatically generated by the prediction engine 125. In one embodiment, the negative training samples could contain digital signatures from audio tracks that are known mismatches. The digital audio file metadata 405 generally contains data describing the audio files from which the digital signatures 340(1)-(2) are generated. Such metadata 405 can include, without limitation, a duration of the audio files, a file size of the audio files, and so on.

Figure 5:
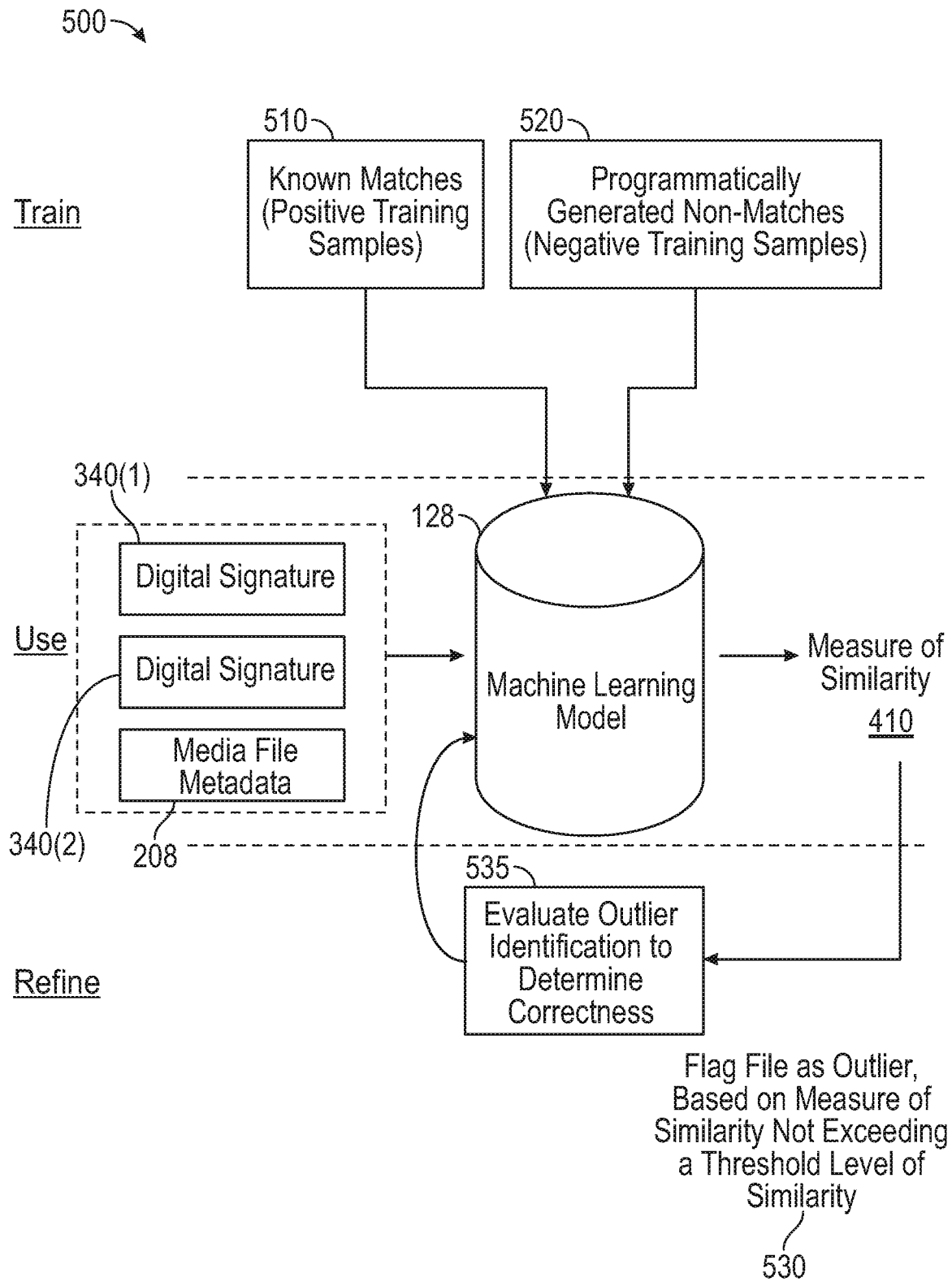
FIG. 5 is a block diagram illustrating a workflow for training, using and refining a machine learning model for comparing digital signatures for audio files, according to one embodiment described herein.

FIG. 5 is a block diagram illustrating a workflow for training, using and refining a machine learning model for comparing digital signatures for audio files, according to one embodiment described herein. As shown, the workflow 500 illustrates a machine learning model 128 being trained using pairs of digital signatures that are known matches (i.e., positive training samples) 510 and pairs of digital signatures that are programmatically generated non-matches (i.e., negative training samples) 520. Although not shown, in an embodiment where the machine learning model 128 also accepts digital audio file metadata 405 as an input, corresponding digital audio file metadata can be provided with each of the known matches 510 and programmatically generated non-matches 520 when training the machine learning model 128.

Once the machine learning model 128 is trained, a pair of digital signatures 340(1) and 340(2), as well as media file metadata 208, are input into the machine learning model 128, and the machine learning model 128 is configured to output an estimated measure of similarity 410 representing the similarity between the two inputs. The measure of similarity could then be used (e.g., by the outlier detection component 118) to determine whether the audio files corresponding to the inputs are likely to correspond to the same instance of media content, or whether one of the audio files represents an outlier. In one embodiment, because frequencies within a predefined range of frequencies are excluded in generating the digital fingerprint, where the predefined range of frequencies generally corresponds to a range of frequencies of human speech, the machine learning model 128 enables efficient comparison between digital audio tracks in different languages.

In the depicted embodiment, in instances where the media file matching component 112 flags one of the digital audio files as an outlier based on the measure of similarity 410 not exceeding a predefined threshold level of similarity (block 530), the digital audio file identified as an outlier can be manually evaluated by a user to evaluate the correctness of the outlier identification by the machine learning model 128 (block 535). The machine learning model 128 can then be refined, based on the results of the evaluation. For example, if the machine learning model 128 correctly identified the audio file as an outlier, one or more weights within the machine learning model can be modified, so that the machine learning model is more likely to generate a lower measure of similarity for inputs similar to the digital signatures 340(1) and 340(2) in the future. As another example, where the machine learning model 128 incorrectly identified the audio file as an outlier, one or more weights within the machine learning model 128 could be modified, so that the machine learning model is more likely to generate a higher measure of similarity for inputs similar to the digital signatures 340(1) and 340(2) in the future. Doing so enables the performance of the machine learning model 128 to be improved over time.

Figure 6:
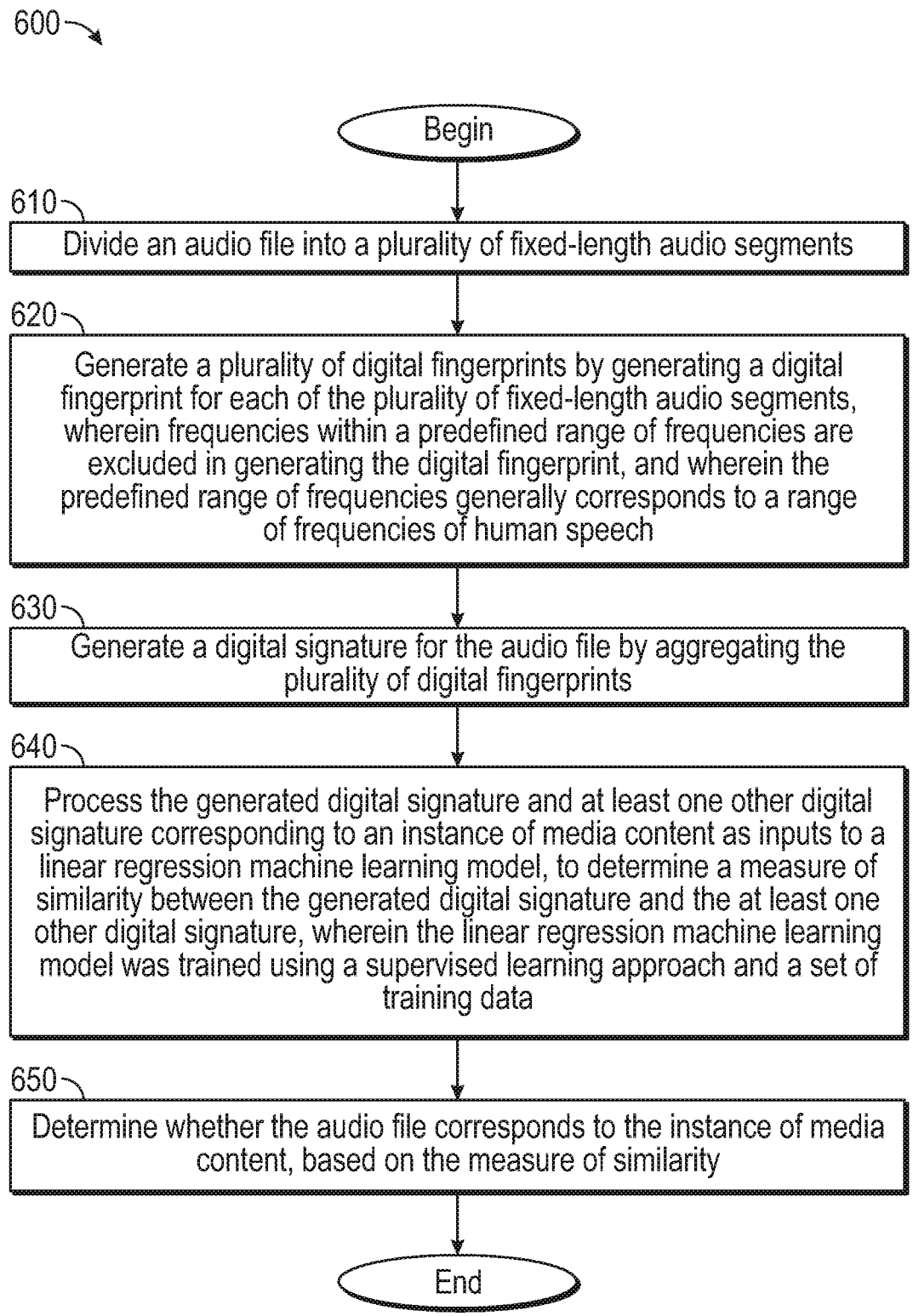
FIG. 6 is a flow diagram illustrating a method of determining whether an audio file corresponds to an instance of media content, according to one embodiment described herein.

FIG. 6 is a flow diagram illustrating a method of determining whether an audio file corresponds to an instance of media content, according to one embodiment described herein. The method 600 begins at block 610, where the media file matching component 110 divides an audio file into a plurality of fixed-length audio segments. The media file matching component 110 then generates a plurality of digital fingerprints by generating a digital fingerprint for each of the plurality of fixed-length audio segments (block 620). In one embodiment, frequencies within a predefined range of frequencies are excluded in generating the digital fingerprint. In a particular embodiment, the predefined range of frequencies generally corresponds to a range of frequencies a human voice is capable of producing.

The digital fingerprinting component 115 of the media file matching component 110 generates a digital signature for the audio file by aggregating the plurality of digital fingerprints (block 630). The media file matching component 110 processes the generated digital signature and at least one other digital signature corresponding to an instance of media content as inputs to a linear regression machine learning model, to determine a measure of similarity between the generated digital signature and the at least one other digital signature. In one embodiment, the linear regression machine learning model was trained using a supervised learning approach and a set of training data (block 640). The media file matching component 110 determines whether the audio file corresponds to the instance of media content, based on the measure of similarity (block 650), and the method 600 ends.

Figure 7:
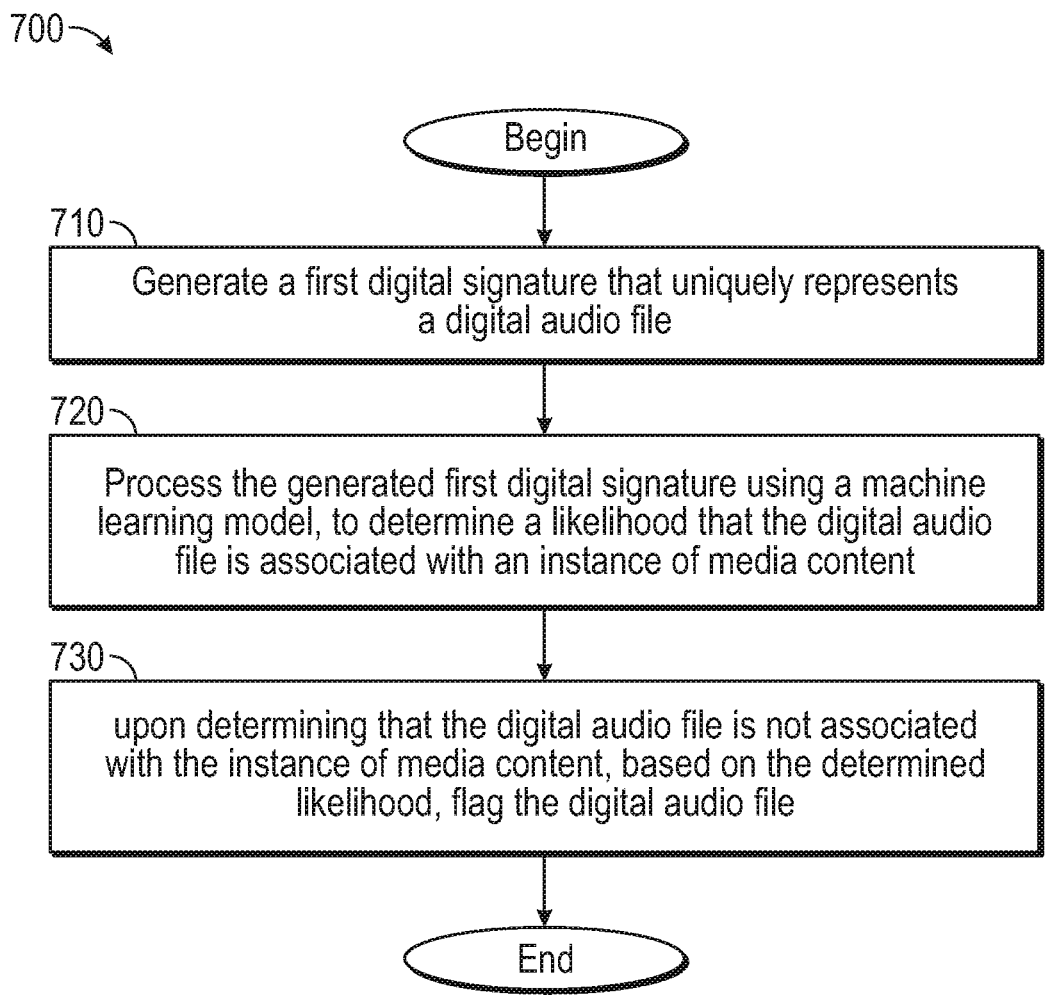
FIG. 7 is a flow diagram illustrating a method of flagging digital audio content that is determined not to be associated with an instance of media content, according to one embodiment described herein.

FIG. 7 is a flow diagram illustrating a method of flagging digital audio content that is determined not to be associated with an instance of media content, according to one embodiment described herein. The method 700 begins at block 710, where the digital fingerprinting component 115 of the media file matching component 110 generates a first digital signature that uniquely represents a digital audio file. The media file matching component 110 processing the generated first digital signature using a machine learning model, to determine a likelihood that the digital audio file is associated with an instance of media content (block 720). Upon determining that the digital audio file is not associated with the instance of media content, based on the determined likelihood, the media file matching component 110 flags the digital audio file (block 730), and the method 700 ends.

Figure 8:
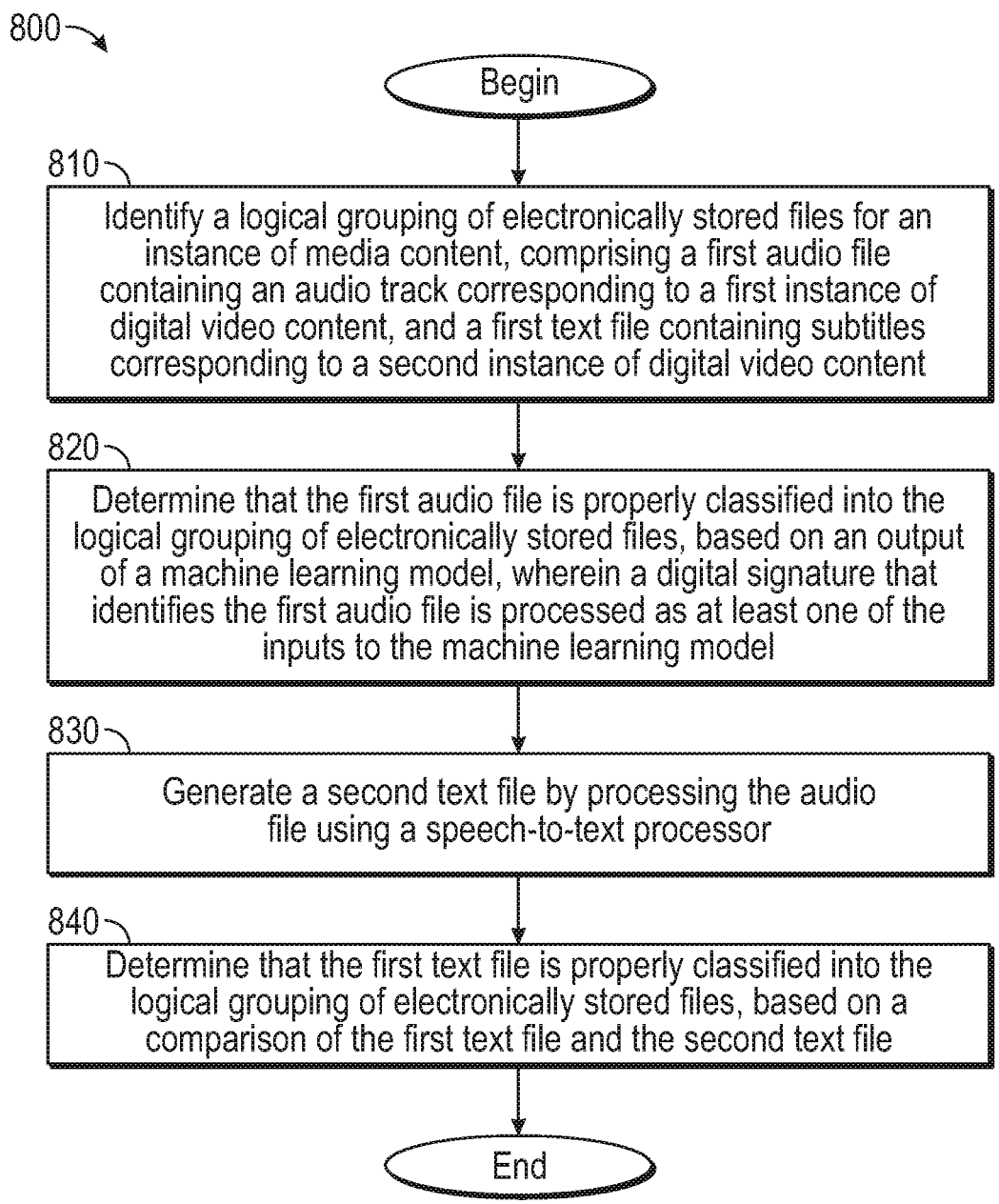
FIG. 8 is a flow diagram illustrating a method of determining whether audio and text files are properly classified into a logical grouping of electronically stored files, according to one embodiment described herein.

FIG. 8 is a flow diagram illustrating a method of determining whether audio and text files are properly classified into a logical grouping of electronically stored files, according to one embodiment described herein. As shown, the method 800 begins at block 810, where the media file matching component 110 identifies a logical grouping of electronically stored files for an instance of media content. The logical grouping of electronically stored files includes a first audio file containing an audio track corresponding to a first instance of digital video content and a first text file containing subtitles corresponding to a second instance of digital video content.

The media file matching component 110 determines that the first audio file is properly classified into the logical grouping of electronically stored files, based on an output of a machine learning model (block 820). The digital signature that identifies the first audio file is processed as at least one of the inputs to the machine learning model. Additionally, the media file matching component 110 generates a second text file by processing the audio file using a speech-to-text processor (block 830). The media file matching component 110 determines that the first text file is properly classified into the logical grouping of electronically stored files, based on a comparison of the first text file and the second text file (block 840), and the method 800 ends.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the media file matching component 110) or related data available in the cloud. For example, the media file matching component 110 could execute on a computing system in the cloud and could process pairs audio files to determine whether the audio files correspond to the same instance of digital content. In such a case, the media file matching component 110 could divide each audio file into segments and could generate a digital fingerprint corresponding to each segment. The media file matching component 110 could then aggregate the fingerprints to generate a digital signature for each audio file, and the media file matching component 110 could use a machine learning model to process the digital signatures to determine an estimated measure of similarity between the digital signatures. The media file matching component 110 could further provide an API 218, through which users can access the results of the comparisons. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method, comprising:
   dividing a first audio file comprising audio in a first language into a plurality of audio segments;
   generating a plurality of digital fingerprints by generating a digital fingerprint for each of the plurality of audio segments, wherein frequencies within a predefined range of frequencies are excluded in generating the digital fingerprint, and wherein the predefined range of frequencies generally corresponds to a range of frequencies of human speech;
   generating a digital signature for the first audio file by aggregating the plurality of digital fingerprints;
   processing the generated digital signature and at least one other digital signature corresponding to an instance of media content as inputs to a linear regression machine learning model, to determine a measure of similarity between the generated digital signature and the at least one other digital signature, wherein the at least one other digital signature is associated with a second audio file comprising audio in a second language and wherein the linear regression machine learning model was trained using a supervised learning approach and a set of training data; and determining whether the first audio file comprising the audio in the first language corresponds to the instance of media content comprising a plurality of audio files associated with a plurality of languages, based on the measure of similarity.

2. The method of claim 1, further comprising:
generating a query that includes at least an indication of the digital signature; and
responsive to submitting the query for execution against a data store, receiving a set of query results containing indications of one or more audio files having similar digital signatures.

3. The method of claim 1, further comprising:
comparing the generated digital signature with a plurality of digital signatures to determine one or more digital signatures that are substantially similar to the generated digital signature;
determining one or more audio files corresponding to the one or more digital signatures that are substantially similar to the generated digital signature; and
generating metadata for the first audio file, based at least in part on metadata corresponding to the one or more audio files.

4. The method of claim 1, further comprising:
comparing the generated digital signature with a plurality of digital signatures corresponding to the instance of media content to determine a plurality of measures of similarity between the generated digital signature with the digital signature and the plurality of digital signatures; and
aggregating the plurality of measures of similarity to determine an aggregate measure of similarity between the first audio file and the instance of media content.

5. The method of claim 1, wherein determining whether the first audio file comprising the audio in the first language corresponds to the instance of media content comprising the plurality of audio files associated with a plurality of languages, based on the measure of similarity, comprises upon determining that the measure of similarity is less than a predefined threshold level of similarity, marking the first audio file as an outlier.

6. The method of claim 1, wherein the set of training data includes a set of positive matches corresponding to known matches between audio files and a set of programmatically generated negative matches of known mismatches between audio files.

7. The method of claim 6, further comprising training the linear regression machine learning model using the supervised learning approach to estimate a similarity between two input digital signatures, using the set of positive matches as positive training samples and using the set of programmatically generated negative matches as negative training samples.

8. A system, comprising:
one or more computer processors; and
a memory containing computer program code that, when executed by operation of the one or more computer processors, performs an operation comprising:
generating a first digital signature that uniquely represents a first digital audio file comprising audio in a first language;
processing, using a machine learning model, the generated first digital signature and a second digital signature associated with a second digital audio file comprising audio in a second language, to determine a likelihood that the first digital audio file comprising the audio in the first language is associated with an instance of media content comprising a plurality of digital audio files, including the second digital audio file, associated with a plurality of languages; and
upon determining that the first digital audio file comprising the audio in the first language is not associated with the instance of media content comprising the plurality of digital audio files associated with the plurality of languages, based on the determined likelihood, flagging the first digital audio file.

9. The system of claim 8, wherein generating the first digital signature that uniquely represents the first digital audio file comprises:
dividing the first digital audio file into a plurality of fixed-length audio segments; and
generating a plurality of digital fingerprints by generating a digital fingerprint for each of the plurality of fixed-length audio segments, wherein frequencies within a predefined range of frequencies are excluded in generating the digital fingerprint, and wherein the predefined range of frequencies generally corresponds to a range of frequencies a human voice is capable of producing.

10. The system of claim 9, wherein generating the first digital signature that uniquely represents the first digital audio file further comprises generating the first digital signature for the first digital audio file by aggregating the plurality of digital fingerprints.

11. The system of claim 8, wherein processing the generated first digital signature using the machine learning model comprises processing the generated first digital signature and the second digital signature as inputs to the machine learning model, wherein the machine learning model is trained to output an estimated measure of similarity between the inputs.

12. The system of claim 11, wherein determining that the first digital audio file is not associated with the instance of media content comprises determining that the estimated measure of similarity does not exceed a predefined threshold level of likelihood.

13. The system of claim 8, wherein the machine learning model comprises a linear regression machine learning model, and the operation further comprising training the linear regression machine learning model using a supervised learning approach to estimate a similarity between two input digital signatures.

14. The system of claim 13, wherein the linear regression machine learning model is trained using a set of training data comprising a set of positive matches as positive training samples and a set of programmatically generated negative matches as negative training samples, wherein the set of training data further includes a set of positive matches corresponding to known matches between digital audio files and a set of programmatically generated negative matches of known mismatches between digital audio files.

15. A non-transitory computer-readable medium containing computer program code that, when executed by operation of one or more computer processors, performs an operation comprising:

generating a first digital signature that uniquely represents a first digital audio file comprising audio in a first language;

processing, using a machine learning model, the generated first digital signature and a second digital signature associated with a second digital audio file comprising audio in a second language, to determine a likelihood that the first digital audio file comprising the audio in the first language is associated with an instance of media content comprising a plurality of digital audio files, including the second digital audio file, associated with a plurality of languages; and upon determining that the first digital audio file is not associated with the instance of media content comprising the plurality of digital audio files associated with the plurality of languages, based on the determined likelihood, flagging the first digital audio file.

16. The non-transitory computer-readable medium of claim 15, wherein generating the first digital signature that uniquely represents the first digital audio file comprises:

dividing the first digital audio file into a plurality of fixed-length audio segments; and generating a plurality of digital fingerprints by generating a digital fingerprint for each of the plurality of fixed-length audio segments, wherein frequencies within a predefined range of frequencies are excluded in generating the digital fingerprint, and wherein the predefined range of frequencies generally corresponds to a range of frequencies a human voice is capable of producing.

17. The non-transitory computer-readable medium of claim 16, wherein generating the first digital signature that uniquely represents the first digital audio file further comprises generating the first digital signature for the first digital audio file by aggregating the plurality of digital fingerprints.

18. The non-transitory computer-readable medium of claim 15, wherein processing the generated first digital signature using the machine learning model comprises processing the generated first digital signature and the second digital signature as inputs to the machine learning model, wherein the machine learning model is trained to output an estimated measure of similarity between the inputs.

19. The non-transitory computer-readable medium of claim 18, wherein determining that the first digital audio file is not associated with the instance of media content comprises determining that the estimated measure of similarity does not exceed a predefined threshold level of likelihood.

20. The non-transitory computer-readable medium of claim 15, wherein the machine learning model comprises a linear regression machine learning model, and the operation further comprising training the linear regression machine learning model using a supervised learning approach to estimate a similarity between two input digital signatures.

* * * * *